United States Patent [19]

Heath et al.

[11] Patent Number: 4,858,114
[45] Date of Patent: Aug. 15, 1989

[54] EMULATION SYSTEM FOR AUTOMATICALLY MODIFYING I/O TRANSLATION TABLES IN PROGRAMS DESIGNED TO RUN ON DIFFERENT TYPES OF COMPUTER

[75] Inventors: Allen W. Heath, Cedar Park; Raymond Hernandez, Austin; Virginia M. Hoffman, Austin; Ronald K. Sheppard, Austin; Susan D. Stratton, Austin, all of Tex.

[73] Assignee: International Business Machines Corporation, Armonk, N.Y.

[21] Appl. No.: 132,719

[22] Filed: Dec. 11, 1987

Related U.S. Application Data

[63] Continuation of Ser. No. 757,233, Jul. 22, 1985, abandoned.

[51] Int. Cl.[4] .................. G06F 3/00; G06F 3/023; G06F 5/00; G06F 13/00
[52] U.S. Cl. ............................................ 364/200
[58] Field of Search ... 364/200 MS File, 900 MS File

[56] References Cited

U.S. PATENT DOCUMENTS

| | | |
|---|---|---|
| 3,886,325 | 5/1975 | Dorr et al. ............... 364/200 |
| 4,031,519 | 6/1977 | Findley ..................... 364/900 |
| 4,162,520 | 7/1979 | Cook et al. ............... 364/200 |
| 4,250,562 | 2/1981 | Haag et al. ............... 364/900 |
| 4,364,025 | 12/1982 | Dalton ....................... 364/200 |
| 4,403,303 | 9/1983 | Howes et al. ............. 364/900 |
| 4,433,377 | 2/1984 | Eustis et al. ............... 364/200 |
| 4,485,439 | 11/1984 | Rothstein ................... 364/200 |
| 4,489,414 | 12/1984 | Titherley ..................... 371/20 |
| 4,559,614 | 12/1985 | Peek et al. ................. 364/900 |
| 4,622,633 | 11/1986 | Ceccon et al. ............. 364/200 |
| 4,646,320 | 2/1987 | Krishnan ..................... 375/8 |
| 4,649,514 | 3/1987 | Berger ......................... 364/900 |

OTHER PUBLICATIONS

*PRINTEXT/370 (Programming RPQ EF3414): Programming Reference,* SH20-1794-2, Third Edition, International Business Machines Corporation, (Oct. 1980).
"Upper/Lower Case and Keyboard Redefined Feature for Word Processor and Electronic Keyboard Character Translation Redefinition", L. P. Andrew et al., *IBM Technical Disclosure Bulletin,* vol. 19, No. 8, Jan. 1977.
"Flexible Keyboards", W. A. Freeman et al, *IBM Technical Disclosure Bulletin,* vol. 22, No. 10, Mar. 1980.

*Primary Examiner*—Archie E. Williams, Jr.
*Assistant Examiner*—Ayni Mohamed
*Attorney, Agent, or Firm*—Douglas H. Lefeve

[57] ABSTRACT

A technique for providing automatic modification of a computer application program adopts the program for compatibility with hardware different from that for which the program was originally written and tested. Upon initial loading of the application program, a search is made to determine the existence of a set of exception tables, external to the application program. If the exception tables are present, all code conversion tables within the application program relating to I/O operations are modified according to the set of exception tables. Plural sets of exception tables may be included with the ability of the operator to choose which set of exception tables will be used to modify the program, thereby allowing the operator to use a single program with a variety of different hardwawre configurations, assuring with each configuration that the intended characters and symbols are displayed and printed.

6 Claims, 3 Drawing Sheets ic
EMULATION SYSTEM FOR AUTOMATICALLY MODIFYING I/O TRANSLATION TABLES IN PROGRAMS DESIGNED TO RUN ON DIFFERENT TYPES OF COMPUTER This is a continuation of application Ser. No. 06/757,233 filed July 22, 1985 abandoned.

DESCRIPTION

TECHNICAL FIELD

This invention relates in general to the transformation of data, and more particularly to a technique for modifying I/O translation tables within a computer program to properly accept, print, and display characters and symbols different from those originally available.

BACKGROUND ART

In recent years there has been a great proliferation in small computer hardware and in the various functions capable of being performed by such computer systems. While the systems were earlier used primarily for accounting and data base management tasks, highly sophisticated programs for word processing and graphics composition have enabled the so-called personal computers to become even more popular.

For the traditional accounting and data base management tasks, it is necessary to display and print only a rather limited set of alphanumeric characters and symbols. Since the number of different characters and symbols to be displayed and printed is relatively low, it is also unnecessary to generate from the keyboard or other character input device, and handle within the program, any more than this relatively low number of characters and symbols. However, with word processing and graphics applications, the requirement for much larger sets of alphanumeric and graphic symbols has arisen.

Personal computers use ASCII (American Standard Code for Information Interchange) data transmission code to convey alphanumeric character and symbol information between the various devices of the computer system. For example, the IBM Personal Computer operates in this ASCII environment whereby data sent to the display, print, or magnetic storage device is conveyed with the standardized ASCII coding. However, the ASCII code set is presently limited to a character set of 256 alphanumeric characters and symbols. While this ASCII based code set is a workable expedient for handling the majority of characters and symbols desired to be used on most small computers, it is by no means capable of supporting all of the characters and symbols in all of the languages for which a popular series of computers is sold.

The International Business Machines Corporation uses a Multilingual Graphics code translation technique which is based on an eight bit EBCDIC (Expanded Binary Coded Decimal Interchange Code) code point and a sixteen bit Code Page Identifier. Thus, each code input to the system (in ASCII or other format) is converted to an eight bit EBCDIC code point along with a sixteen bit identifier of the Code Page to which the eight bit EBCDIC Code Page refers. Therefore, if ASCII is the code input to this technique, it will be understood that an eight bit ASCII code is expanded by this MLG technique into twenty-four bits of information. This means, of course, that many more symbols of many more languages can be handled when twenty-four bits are available for their identification rather than eight bits. With the exception of the IBM Personal Computer family, the IBM Corporation uses the MLG technique with most of the other computer products that it markets. For word processing application programs designed to run on the IBM Personal Computer family, most developers of such software other than IBM have remained within the ASCII code environment. In contrast, IBM's DisplayWrite 2 and 3 programs use the MLG EBCDIC technique of handling text and symbols. As a result of this, these programs are not limited to the 256 text and symbol characters available in ASCII, but, instead are capable of handling many accented characters and other symbols beyond those normally handled in English documents.

With this approach, however, a very significant problem exists in that the IBM Personal Computers sold in one country may differ in their handling of certain coded characters from the way other IBM Personal Computers handle those same keyed characters. For programs such as the aforementioned IBM DisplayWrite 2 and DisplayWrite 3 applications, it was then necessary to modify the programs to run correctly on the slightly different hardware. That is, it was necessary to modify the program to convert a particular ASCII code point generated from the keyboard into the corresponding character in MLG that that particular country intended to be described by that particular ASCII code point. Thus, it will be understood that the software industry is now having to deal with machines in which the ASCII definition of the character or symbol to be represented by a particular code point may vary depending on the country.

It will therefore be understood that a basic problem exists in ensuring that a text processing program operates as intended when it is capable of being loaded into a variety of identical looking machines which may handle the ASCII code points in varying ways. The previous method used by IBM for the DisplayWrite 2 program to support all of the various countries, required modifications to the program and extensive testing to make sure that the programs were correctly modified to properly operate on the different hardware. This problem is further compounded when marketing of the hardware and software are considered in additional countries with additional, unusual language requirements. However, without modification to the programs, it is easy to understand how many characters and/or symbols will be reproduced in a manner other than that intended if the program is not fully compatible with the hardware.

A somewhat similar problem with compatibility has been addressed relative to printers which were, perhaps, one of the first devices to exhibit a deviation from the ASCII "standard." Most printers do not define all of the ASCII code points. In addition to not supporting the complete ASCII set, many printers also require a different mapping than that defined by the IBM Personal Computer. This different mapping is especially noticeable in printers that were in existence prior to the release of the IBM Personal Computer. Applications which need to work with these printers must include some method for describing the special character mappings. Most early applications included this information within the program. The disadvantages of this became apparent with the dramatic increase in the number of printers available. It is no longer reasonable to change the application program every time support for a new printer is desired. A solution to this problem with printers was to utilize predefined external tables for conversion of particular codes in the program to the desired printer codes. This prevented having to change the application program to support each additional printer The ultimate solution to this problem is described in copending U.S. Pat. No. 4,710,886, filed Oct. 24, 1984, issued Dec. 1,1987 in which the user is given the capability to create his own external table to define the particular mapping of his printer. The above described solution to the printer compatibility problem, however, is effective only when the IBM DisplayWrite 3 word processing program and hardware are "synchronized." Such synchronization only occurs when the ASCII to MLG and MLG to ASCII translations within the DisplayWrite program are compatible with the intended meanings of the ASCII code points at the hardware level. Thus, the solution of a user defined printer table does not address the potential hardware/software compatibility problem.

Therefore, it would be greatly advantageous if a technique were made available to provide compatibility between a generic program and varying hardware configurations on which it might be operated to assure that particular ASCII code points are handled by the system as intended by the operator.

SUMMARY OF THE INVENTION

Accordingly, upon initial loading of an application program an exception table, external to the application program, is called to determine the presence thereof. If the external exception table is present, then all tables within the application program which convert ASCII to MLG EBCDIC, MLG EBCDIC to ASCII, and other internal code to ASCII are modified according to this set of exception tables which are external to the application program. If no such set of external exception tables is found during this initial program loading of the application, it is assumed that the application program being loaded is totally compatible with the hardware on which it is being loaded, without any need for further modification. Plural sets of external exception tables may be included with the ability of the operator to chose which set of exception tables will be used to modify the program to, thereby, allow the operator to use a single program package with a variety of different hardware configurations.

More specifically, the invention herein described provides for the capability of an automatic modification of a plurality of internal tables of a complex word processing program such as the IBM DisplayWrite 3 word processing program upon initial loading of the program into a personal computer. The IBM DisplayWrite 3 program contains basically three types of internal tables that deal with the translation of ASCII codes. A first of these types of tables maps an input ASCII code into an MLG EBCDIC code. Another type of table maps an MLG EBCDIC code into an ASCII code for presentation. A third type of the tables maps icon formatting information internally generated by the DisplayWrite 3 program into ASCII code points for presentation. With the operation of this invention, each of these three types of tables becomes modified by the data stored in the external exception tables. These exception tables are tailored to the differences between the hardware intended for the DisplayWrite 3 program when it is run without this modification and the hardware on which the DisplayWrite 3 is to run with this modification.

The foregoing and other objects, features, extensions, and advantages of the invention will be apparent from the following more particular description of a preferred embodiment of the invention, as illustrated in the accompanying drawings.

DETAILED DESCRIPTION OF THE PREFERRED EMBODIMENTS

Figure 1:
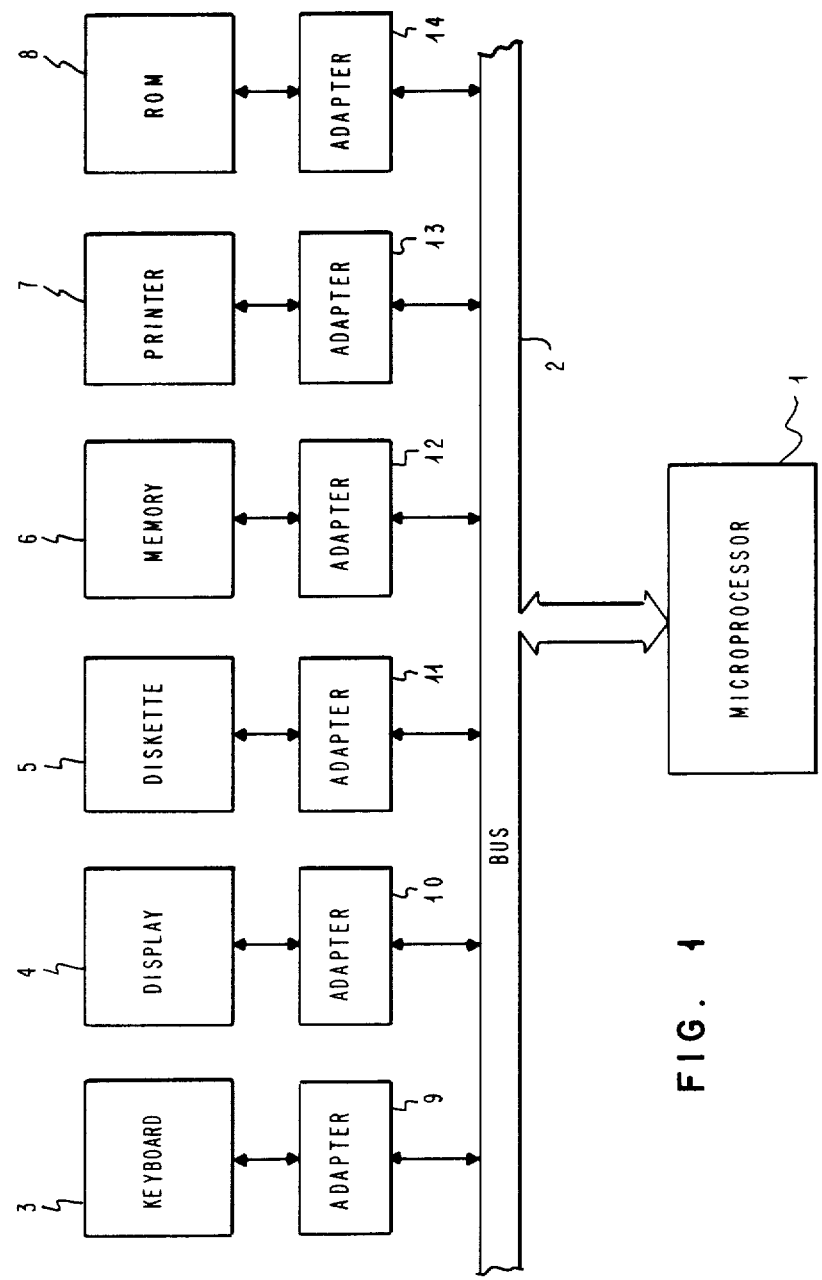
FIG. 1 is a block diagram of a typical personal computer system which includes a plurality of I/O devices which receive codes subject to modification according invention.

Referring now to FIG. 1 a typical personal computer architecture is shown, such as the configuration used in the IBM Personal Computer. The focal point of this architecture comprises a microprocessor 1 which may, for example, be an Intel 8088 or similar microprocessor. The microprocessor 1 is connected to a bus 2 which comprises a set of data lines, a set of address lines and a set of control lines. A plurality of I/O devices or memory or storage devices 3-8 are connected to the bus 2 through separate adapters 9-14, respectively. For example, the display 4 may be, for example, the IBM Personal Computer Color Display and the adapter 10 may, accordingly, be the IBM Color/Graphics Display Adapter. The other devices 3 and 5-8 and adapters 9 and 11-14 are either included as part of an IBM Personal Computer or are available as plug-in options from the IBM Corporation. For example, the random access memory 6 and the read-only memory 8 and their corresponding 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. As will be described hereinafter, the BIOS controls the fundamental operation of the computer. An operating system such as the disk operating system or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modification of the basic system operation by changes made to the BIOS program, which would then be readily loadable into the random access memory 6.

An application program such as the IBM DisplayWrite 3 word processing program, may also be loaded into the memory 6 to provide instructions to the microprocessor 1 to enable a comprehensive set of word processing tasks to be performed by the personal computer system shown in FIG. 1. An application program loaded into the memory 6 is said to run in conjunction with the disk operating system previously loaded into the memory 6.

Figure 2:
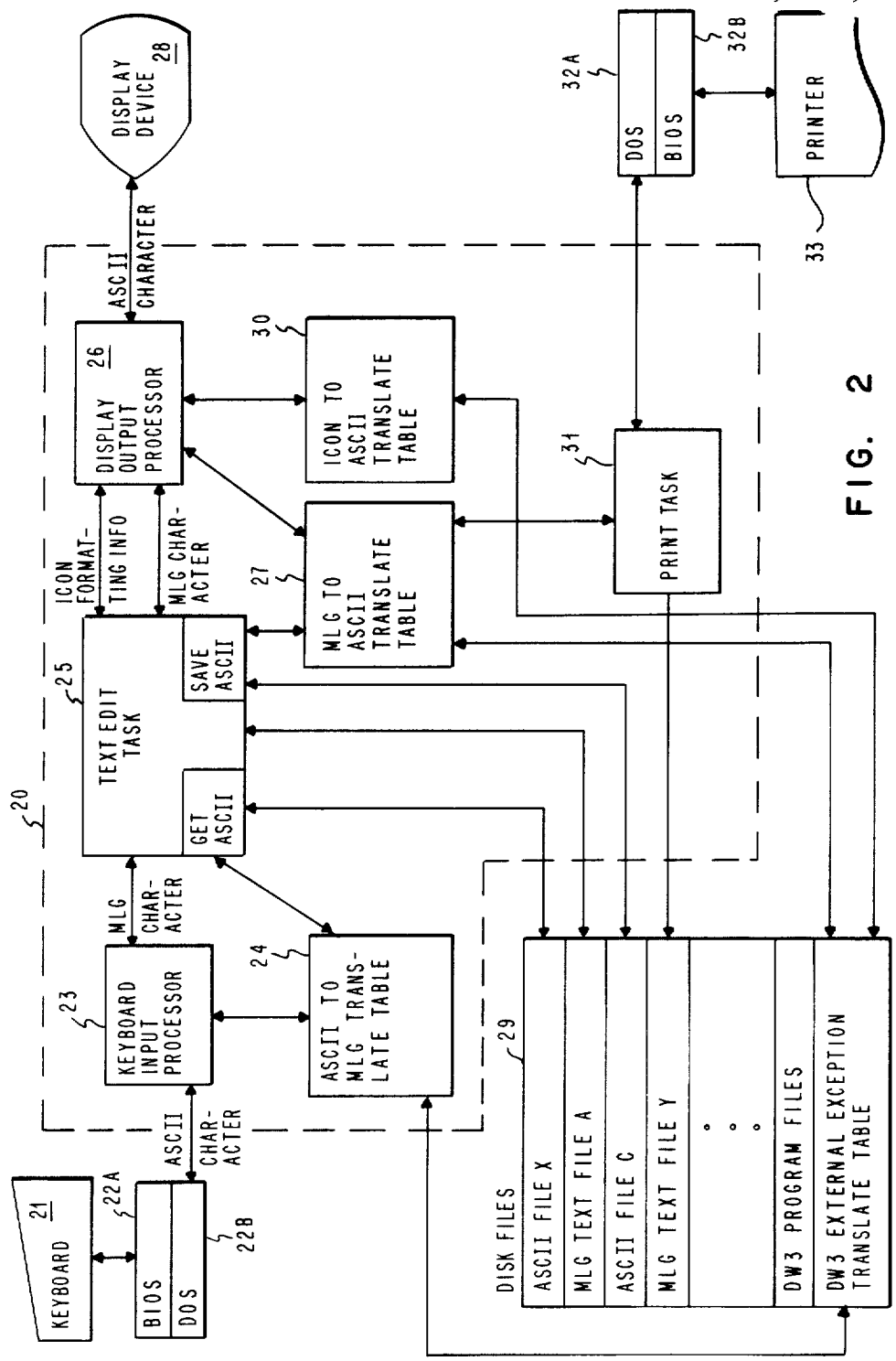
FIG. 2 shows the data flow in a typical personal computer system, such as that shown in FIG. 1, including the modification of tables within an application program according the principles of this invention.

With the above description of a typical computer configuration, reference is now made to FIG. 2 which shows the data flow within such a personal computer system during the course of use of a program such as the IBM DisplayWrite 3 word processing program. Text documents created by use of such a word processing program are most often created or revised using character data entered from the keyboard 21. Pressing a key on the keyboard 21 creates a hardware scan code which is passed to both the BIOS 22A and the DOS 22B such as described above relative to FIG. 1. The BIOS 22A may, for example, be stored in the ROM 8 (FIG. 1) and the DOS 22B may be stored in the memory 6 (FIG. 1). The BIOS 22A and DOS 22B translate the hardware scan code from the keyboard 21 into an 8 bit ASCII character code. This ASCII code is then passed to the keyboard input processor 23. The keyboard input processor 23 is contained within the IBM DisplayWrite 3 program within the dashed block 20 in FIG. 2. Accordingly, each of the other elements 24–27 and 30–31 within block 20, to be described hereinafter, are a part of the IBM DisplayWrite 3 word processing program.

The keyboard input processor 23 uses an ASCII to MLG translate table 24 to produce the correct MLG (multi-lingual graphics EBCDIC) character. This MLG character is then passed to the text edit task 25. The text edit task 25 incorporates this newly generated MLG character into the text of the current document being edited by the IBM DisplayWrite 3 program of block 20. The MLG data of the document currently being edited is then passed to the display output processor 26 to generate the appropriate information to be sent to the display device 28 to, thereby, reflect to the operator the incorporation of the code most recently keyed at the keyboard 21. The display device 28 may be, for example, a display and adapter such as those described relative to elements 4 and 10 of FIG. 1. The display output processor 26 uses the MLG to ASCII translate table 27 to generate the correct ASCII character to pass to the display device During editing the DisplayWrite 3 word processing program utilizes a scale line on the display to present to the operator the formatting information other than the actual text characters. This information includes icons to indicate left and right margins, paper edge, tab settings, and the current left-right position of the cursor. Since these icons are not produced as a direct translation of an MLG character, they require an additional translation operation. The display output processor 26 uses the icon formatting information received from the text edit task 25 and the ICON to ASCII translate table 30 to generate the appropriate ASCII characters to pass to the display device 28. As one example of this, the horizontal position of the currently chosen right margin during a document creation or editing task is depicted on the scale line of the DisplayWrite 3 word processing program by a pair of "greater than" symbols. In this case, the text edit task 25 conveys the icon formatting information needed by the display output processor 26 which, in turn, addresses the appropriate code point in the ICON to ASCII translate table 30 to provide the appropriate ASCII code point to display the pair of "greater than" symbols at the right margin position on the scale line.

Interactively during the editing phase, and at the completion of editing of the document by the text edit task 25, the contents of the text document are written to a file such as the MLG text file A of the disk files 29. The disk files 29 may be stored, for example, on a diskette such as the diskette 5 in FIG. 1 controlled by the diskette adapter 11 in FIG. 1.

When it is desired to print an MLG text file from the disk files 29, the print task 31 reads the MLG text file from the disk files 29. In this example, it is shown that the MLG text file Y is communicated to the print task 31. If the printer has been identified to the DisplayWrite 3 word processing program as accepting ASCII data, then the print task 31 uses the MLG to ASCII table 27 to generate the correct ASCII code points to pass to the DOS portion 32A and the BIOS portion 32B which, in turn, send the data to a printer 33. The printer 33 may be, for example, a printer such as a printer 7 shown in FIG. 1 controlled by a printer adapter such as the adapter 13 shown in FIG. 1.

While editing an MLG text document, the operator may decide to import into the document data from an external ASCII file. This would typically be data generated by some application other than DisplayWrite 3 or by a host program. In this case the text edit task 25 reads an ASCII file, such as the ASCII file X from the disk files 29 and uses the ASCII to MLG translate table 24 to produce the correct MLG characters for inclusion into the MLG text document. Conversely, while editing an MLG text document the operator may decide to export all or a part of the text into an external ASCII file. Such an operation would typically be performed to make data available to other applications or to host programs which work only with ASCII data. The text edit task 25 uses the MLG to ASCII table 27 to produce the correct ASCII characters for the selected portion of the text and stores the result in a file such as the ASCII file C of the disk files 29.

As stated above, the three translate tables 24, 27, and 30 shown in FIG. 2, are all contained within the DisplayWrite 3 program files. In version 1.0 of DisplayWrite 3, these table definitions are fixed, with no capability to alter them except by reprogramming updated versions of the DisplayWrite 3 files. The importance and usefulness of the invention described herein can best be understood by considering an interchange scenario with another system which understands MLG. Consider a hypothetical hardware configuration A in which the ASCII code point 155 represents the cent character. That is, when this code point is given to the display device or printer, the cent character is displayed or printed. Consider further, a hypothetical hardware configuration B in which the same ASCII code point 155 represents the "small o slash". That is, when code point 155 is given to the display device or printer, a lower case "o" with a slash mark overlaid thereon is produced.

The basic problem addressed by this invention, therefore, is that of processing this single ASCII code point which means different things to the different hardware configurations so that the differences in the hardware configurations can be accommodated without requiring several unique versions of an application program such as DisplayWrite 3, with each unique version including updated translate tables for each hardware configuration. Of utmost importance is preserving the original character definition of the ASCII code and elimination of multiple, hardware-dependent versions of the application program.

The solution to this problem is to make a one-time change to the initialization logic of the application program to look for an external file which, if found, is used to update the various internal translate tables. These external tables are set up as an exception table so that only differences from the base hardware configuration need be addressed. Thus for the hardware configuration A described above, the ASCII code point 155 would be translated into the correct MLG code point for the cent character. For the hardware configuration B described above this same ASCII code point would be translated into the MLG code point for the "o" overlaid by the slash mark. Accordingly, the application program becomes modified to adapt to a different meaning of an ASCII code point than was originally intended when the application was written.

With this arrangement one version of the application program can be used to support various hardware configurations. Therefore, program customization for a hardware configuration is accomplished by including an external table which describes the specific hardware configuration. By including several differing tables and specific user instructions as to how, the application program can be caused to select a particular table, one program may be used to support a multiplicity of hardware configurations.

Figure 3:
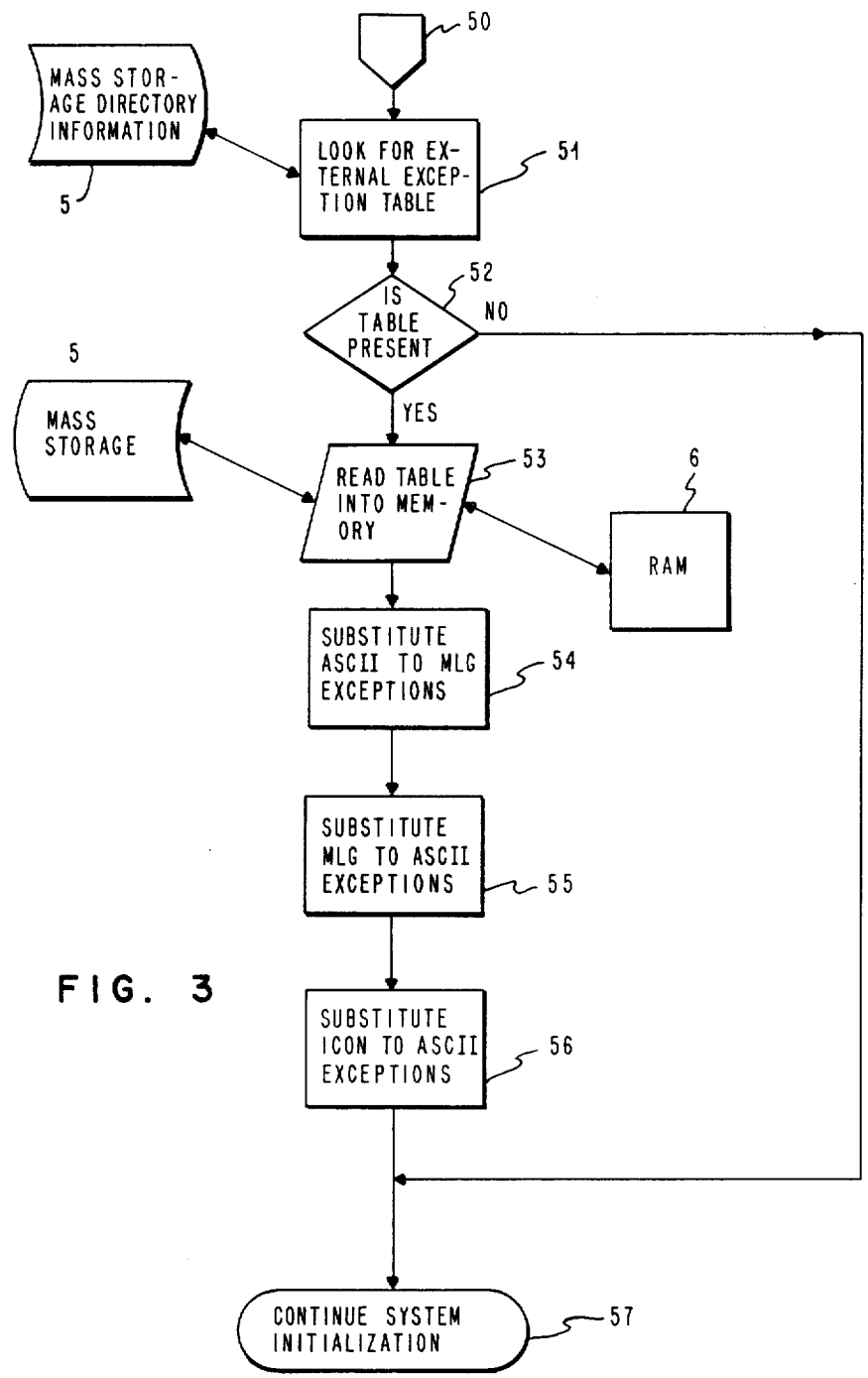
FIG. 3 is a flow chart which shows the modification of tables within an application program in response to the presence of a set of external exception tables, according to the principles of this invention.

The flow chart in FIG. 3 shows the modification of tables within an application program in response to the presence of a set of external exception tables, according to the principles of this invention. The operation of this routine begins at block 50 whereupon the application initialization function performs a subroutine at 51 which checks the directory information of a mass storage device, such as diskette 5 (FIG. 1), for the presence of an exception table external to the application program being loaded. At 52 if the exception table is not present the operation proceeds to 57 whereupon initialization of the system and loading of the application program continues. If, however, the exception table is present, at 53 the table is read from the mass storage device 5 into the system random access memory 6. At 54, the exceptions are made to the ASCII to MLG translate table 24 (FIG. 2). At 55, the exceptions are made to the MLG to ASCII translate table 27 (FIG. 2). Finally, at 56 the exceptions are made to the ICON to ASCII translate table 30 (FIG. 2). Following the loading of each of these external exceptions into the internal tables of the application program, operation proceeds to 57 for continuation of the system initialization.

The exceptions represented in the external tables which modify the internal tables of the application program may be represented in a variety of ways. The exceptions may be designed to entirely overwrite selected entries in the internal tables. Alternatively, the exceptions may be designed to be added to the values to be modified in the internal tables. The former approach might take more mass storage space for the exception tables themselves, but less processing time when these tables are used to modify the internal tables in the application program. The latter approach may take significantly less mass storage space on a diskette, for example, but might take considerably more processing time in modifying the internal tables of the application program.

The following programming design language listing is another form of the description of the above technique of modifying the internal tables of an application program by the presence of an external set of exception tables. This listing parallels the operation described relative to FIGS. 2 and 3.

```
BEGIN EXCEPTION PROCESS
   IF EXTERNAL EXCEPTION TABLE PRESENT ON MEDIA THEN
      LOAD TABLE INTO MEMORY
      WHILE ASCII TO MLG EXCEPTION ENTRIES DO
         SUBSTITUTE EXCEPTIONS INTO ASCII TO MLG
            INTERNAL TABLES
      ENDDO
      WHILE MLG TO ASCII EXCEPTION ENTRIES DO
         SUBSTITUTE EXCEPTIONS INTO MLG TO ASCII
            INTERNAL TABLES
      ENDDO
      WHILE ICON TO ASCII EXCEPTION ENTRIES DO
         SUBSTITUTE EXCEPTIONS INTO ICON TO ASCII
            INTERNAL TABLES
      ENDDO
   ENDIF
END EXCEPTION PROCESS
```

It will be noted that the disk files 29 contain the external exception translate table. Thus, as described above with reference to the flow chart of FIG. 3, the contents of this translate table are used to modify the internal tables 24, 27, and 30 of the application program.

In summary, a technique has been described for modifying a computer application program for use with a hardware configuration other than that for which the program was originally written. The modification is accomplished upon the initial loading of the application program whereupon a set of exception tables, external to the application program, are called to determine the presence thereof. If the exception tables are present, all code conversion tables relating to I/O operations within the application program are modified according to the set of exception tables. Plural sets of exception tables may be included, with the ability of the operator to choose which set of exception tables will be used to modify the program, thereby allowing the operator to use a single program package with a variety of different hardware configurations.

While the invention has been shown and described with reference to particular embodiments thereof, it will be understood by those skilled in the art that the foregoing and other changes in form and details may be made therein without departing from the spirit and scope of the invention.

I claim:

1. A method for automatically modifying parameters within an execution of a reconfigurable, table driven computer program originally designed to run on a first type of computer system configured in a first way, to properly interface with I/O devices for said reconfigurable program to run on a different, second type of computer system configured in a second way, comprising:

(a) storing in a random access memory of said second type of computer system a set of exception tables to selectively alter particular entries of a set of code conversion tables within said reconfigurable program to redefine the meaning of selected codes within said reconfigurable program;

(b) providing initialization logic in said reconfigurable program and using said logic during initial loading of said reconfigurable program to cause said reconfigurable program to cause said second type of computer system to search for the presence of said set of exception tables in said random access memory in addition to said reconfigurable program during loading of said reconfigurable program into said second type of computer;

(c) utilizing said second type of computer and said exception tables, during said loading of said reconfigurable program into said second type of computer, upon the detection of the presence of said exception tables in said random access memory, to automatically, selectively alter, without operator intervention, said particular entries of said set of code conversion tables according to values stored in said exception tables.

2. The method of claim 1 wherein a table of said set of code conversion tables within said reconfigurable program is utilized to convert ASCII code to MLG EBCDIC code.

3. The method of claim 1 wherein a table of said set of code conversion tables within said reconfigurable program is utilized to convert MLG EBCDIC code to ASCII code.

4. The method of claim 1 wherein a table of said set of code conversion tables within said reconfigurable program is utilized to convert icon formatting information to ASCII code.

5. The method of claim 1 wherein said step of storing said set of exception tables further comprises building each of said set of exception tables with values to be logically combined with preselected data in said code conversion tables.

6. The method of claim 1 wherein said step of storing said set of exception tables further comprises building each of said set of exception tables with values to be substituted for preselected data in said code conversion tables.

* * * * *